(12) United States Patent
Sugiyama et al.

(10) Patent No.: US 9,688,498 B2
(45) Date of Patent: Jun. 27, 2017

(54) SHEET TRAY, CONVEYANCE UNIT AND IMAGE RECORDING APPARATUS

(71) Applicant: Brother Kogyo Kabushiki Kaisha, Nagoya-shi, Aichi-ken (JP)

(72) Inventors: Wataru Sugiyama, Nishio (JP); Yoshiyuki Washino, Hashima-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/166,357

(22) Filed: May 27, 2016

(65) Prior Publication Data

US 2016/0347570 A1 Dec. 1, 2016

(30) Foreign Application Priority Data

May 29, 2015 (JP) .................. 2015-109821

(51) Int. Cl.
| | |
|---|---|
| *B65H 31/20* | (2006.01) |
| *B65H 1/04* | (2006.01) |
| *B65H 3/06* | (2006.01) |
| *B65H 5/06* | (2006.01) |
| *B65H 29/22* | (2006.01) |
| *B65H 43/04* | (2006.01) |
| *H04N 1/00* | (2006.01) |

(52) U.S. Cl.
CPC ............... *B65H 31/20* (2013.01); *B65H 1/04* (2013.01); *B65H 3/0684* (2013.01); *B65H 5/068* (2013.01); *B65H 29/22* (2013.01); *B65H 43/04* (2013.01); *H04N 1/0057* (2013.01); *H04N 1/00636* (2013.01); *H04N 2201/0094* (2013.01)

(58) Field of Classification Search
CPC .......... B65H 31/20; B65H 2405/11164; B65H 2405/111648; B65H 2405/1117
USPC ........................................ 271/3.14, 171, 223
See application file for complete search history.

(56) References Cited

U.S. PATENT DOCUMENTS

| 7,584,959 B2 | 9/2009 | Kinoshita et al. |
| 8,430,399 B1 * | 4/2013 | Huang .................... B65H 1/04 |
| | | 271/171 |
| 2007/0114714 A1 | 5/2007 | Kinoshita et al. |
| | | (Continued) |

FOREIGN PATENT DOCUMENTS

| JP | H08-169618 A | 7/1996 |
| JP | 2003-112847 A | 4/2003 |
| | (Continued) | |

*Primary Examiner* — David H Bollinger
(74) *Attorney, Agent, or Firm* — Banner & Witcoff, Ltd.

(57) ABSTRACT

There is provided a sheet tray including: first, second and third trays. The second tray moves between a first position and a second position in which an overlapping area is smaller than that obtained in the first position. The third tray includes a third support surface and a fourth support surface. The third support surface includes a protrusion which protrudes upward to be positioned above the first support surface in a state that the third tray is in the first pivoting position. The third tray overlaps with the first support surface in a state that the second tray is in the first position and that at least a part, of the third tray, except for the protrusion is positioned below the first support surface, and the third tray does not overlap with the first support surface in a state that the second tray is in the second position.

10 Claims, 10 Drawing Sheets

(56) References Cited

U.S. PATENT DOCUMENTS

| | | | |
|---|---|---|---|
| 2010/0124449 A1* | 5/2010 | Asada | B65H 1/04 399/393 |
| 2011/0278789 A1* | 11/2011 | Otani | B65H 31/20 271/207 |
| 2013/0009360 A1* | 1/2013 | Ma | G03G 15/6552 271/279 |
| 2014/0319760 A1* | 10/2014 | Komuro | B65H 1/02 271/223 |
| 2014/0367909 A1* | 12/2014 | Wang | B65H 1/04 271/171 |
| 2015/0042030 A1 | 2/2015 | Washino | |
| 2015/0042035 A1* | 2/2015 | Washino | B65H 1/04 271/145 |
| 2015/0266681 A1* | 9/2015 | Sato | B65H 1/04 271/9.11 |

FOREIGN PATENT DOCUMENTS

| | | |
|---|---|---|
| JP | 2007-161481 A | 6/2007 |
| JP | 2015-034067 A | 2/2015 |

* cited by examiner

SHEET TRAY, CONVEYANCE UNIT AND IMAGE RECORDING APPARATUS

CROSS REFERENCE TO RELATED APPLICATION

The present application claims priority from Japanese Patent Application No. 2015-109821 filed on May 29, 2015, the disclosure of which is incorporated herein by reference in the entirety.

BACKGROUND

Field of the Invention

The present invention relates to a sheet tray configured to support a sheet discharged from an apparatus body, a conveyance unit with the same, and an image recording apparatus with the same.

Description of the Related Art

Image recording apparatuses, such as printers, typically include sheet trays supporting sheets discharged from the image recording apparatuses. In recent years, there are needs downsized image recording apparatuses which can record images on large sheets. In order to meet this demand, there is known a sheet tray including a main tray, a first auxiliary tray which is axially and pivotally supported by the main tray, and a second auxiliary tray which is axially and pivotally supported by the first auxiliary tray.

In the known sheet tray, the second auxiliary tray may be in a first state in which the second auxiliary tray is housed in a cutout or notch of the first auxiliary tray. When the second auxiliary tray is in the first state, a surface of the second auxiliary tray supports a sheet in cooperation with the main tray and the first auxiliary tray. The second auxiliary tray, which has pivoted from the first state, has a second state in which the second auxiliary tray extends beyond the first auxiliary tray. When the second auxiliary tray is in the second state, the back surface of the second auxiliary tray can support a sheet, which has a size larger than the sheet capable of being supported by the second auxiliary tray in the first state, in cooperation with the main tray and the first auxiliary tray.

The second auxiliary tray includes a sheet stop mechanism. The sheet stop mechanism makes contact with the front end of a sheet to be discharged, thereby stopping the sheet. This prevents the sheet from falling from the sheet tray and allows front ends of sheets in a discharge direction to be lined up. In the known sheet tray, the sheet stop mechanisms are respectively provided for the front surface and the back surface of the second auxiliary tray. The sheet stop mechanism provided in the front surface is disposed at a position suitable for stopping a sheet having a predetermined size. The sheet stop mechanism provided in the back surface is disposed at a position suitable for stopping a sheet having a size larger than the predetermined size.

SUMMARY

However, when a sheet even larger than the sheet having the size larger than the predetermined size is discharged toward the known sheet tray, this sheet is stopped at an inappropriate position by the sheet stop mechanism and the sheet can not go more in the discharge direction. This may cause jam of the sheet in the image recording apparatus.

The present teaching has been made to solve the above problem, and an object of the present teaching is to provide a sheet tray which stops a small sheet reliably and is less likely to cause jam of a large sheet.

According to an aspect of the present teaching there is provided a sheet tray configured to support a sheet, including:

a first tray having a first support surface configured to support the sheet discharged from an apparatus body in a first direction;

a second tray having a second support surface configured to support the sheet and being supported by the first tray to be movable between a first position and a second position in the first direction, the first position being a position in which at least a part of the second support surface positioned below the first support surface overlaps with the first support surface, the second position being in the first direction more than the first position and having an overlapping area of the second support surface and the first support surface which is smaller than that obtained in the first position; and a third tray pivotally supported by the second tray and configured to pivot between a first pivoting position and a second pivoting position, the first pivoting position being a position in which a pivoting front end of the third tray is positioned on an upstream side of a pivoting shaft of the third tray in the first direction, the second pivoting position being a position in which the pivoting front end is positioned on a downstream side of the pivoting shaft in the first direction to extend beyond the second tray in the first direction, wherein the third tray includes a third support surface configured to support the sheet in cooperation with the second support surface with the third tray being in the first pivoting position and a fourth support surface being a back surface of the third support surface and configured to support the sheet in cooperation with the second support surface with the third tray being in the second pivoting position, the third support surface includes a protrusion which protrudes upward to be positioned above the first support surface in a state that the third tray is in the first pivoting position; and the third tray overlaps with the first support surface in a state that the second tray is in the first position and that at least a part, of the third tray, except for the protrusion is positioned below the first support surface, and the third tray does not overlap with the first support surface in a state that the second tray is in the second position.

In the above configuration, when the second tray is in the second position and the third tray is in the first pivoting position, the sheet is supported by the first support surface, the second support surface, and the third support surface. In this situation, the sheet discharged in the first direction makes contact with the protrusion and stopped thereby. This prevents the sheet from falling from the sheet tray.

When the second tray is in the second position and the third tray is in the second pivoting position, the sheet is supported by the first support surface, the second support surface, and the fourth support surface. In this situation, the pivoting front end of the third tray in the state that the third tray is in the second pivoting position is positioned on a downstream side, in the first direction, of the pivoting front end of the third tray in the state that the third tray is in the first pivoting position. The third tray in the second pivoting position extends beyond the second tray in the first direction. Thus, the third tray in the second pivoting position can support a sheet larger than a sheet which can be supported by the third tray in the first pivoting position.

The fourth support surface has no protrusion. Thus, when a sheet, which is longer in the first direction than the total length of the first support surface, the second support surface, and the fourth support surface, is discharged, the sheet is not stopped at an inappropriate position. This reduces the possibility that the sheet is jammed in the apparatus body.

The sheet tray of the present teaching can stop a small sheet reliably and is less likely to cause the jam of a large sheet.

BRIEF DESCRIPTION OF THE DRAWINGS

FIGS. 3A and 3B each depict a discharge tray 21 in which a first tray 81 is housed in a body tray 80, a second tray 82 is housed in the first tray 81, and a third tray 83 is in a first pivoting position, wherein FIG. 3A is a perspective view and FIG. 3B is a cross sectional view taken along the arrow IIIB-IIIB of FIG. 3A.

FIGS. 4A and 4B each depict the discharge tray 21 in which the first tray 81 is pulled from the body tray 80, the second tray 82 is housed in the first tray 81, and the third tray 83 is in the first pivoting position, wherein FIG. 4A is a perspective view and FIG. 4B is a cross sectional view taken along the arrow IVB-IVB of FIG. 4A.

FIGS. 5A and 5B each depict the discharge tray 21 in which the first tray 81 is pulled from the body tray 80, the second tray 82 is pulled from the first tray 81, and the third tray 83 is in the first pivoting position, wherein FIG. 5A is a perspective view and FIG. 5B is a cross sectional view taken along the arrow VB-VB of FIG. 5A.

FIGS. 6A and 6B each depict the discharge tray 21 in which the first tray 81 is pulled from the body tray 80, the second tray 82 is pulled from the first tray 81, and the third tray 83 is in a second pivoting position, wherein FIG. 6A is a perspective view and FIG. 6B is a cross sectional view taken along the arrow VIB-VIB of FIG. 6A.

DESCRIPTION OF THE EMBODIMENTS

Figure 1:
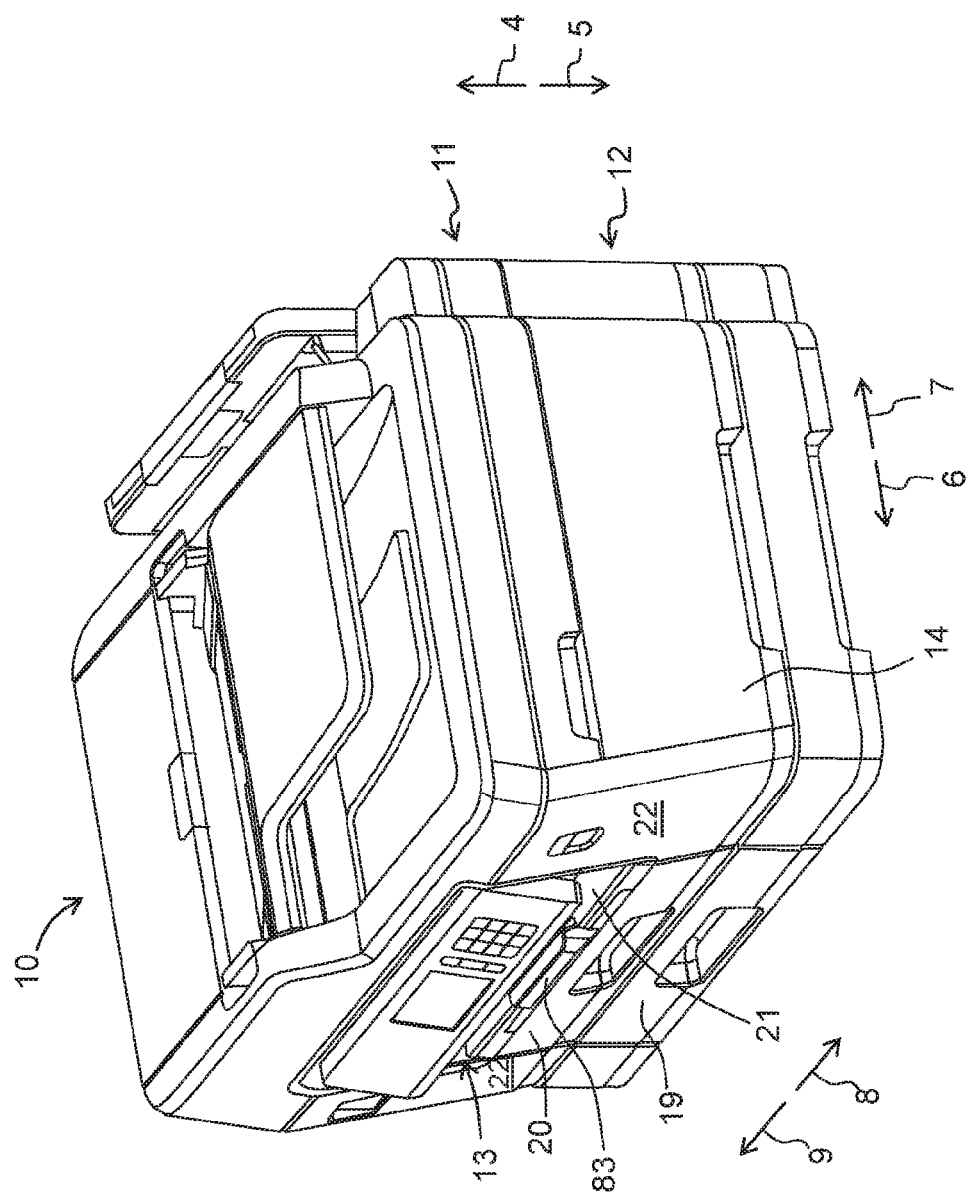
FIG. 1 is a perspective view of a multifunction peripheral 10.

In the following, an explanation will be made about a multifunction peripheral 10 according to an embodiment of the present teaching. It is needless to say that the embodiment to be explained below is merely an example of the present teaching, and it is possible to appropriately change the embodiment of the present teaching without departing from the gist and scope of the present teaching. In the following explanation, an upper direction 4 and a lower direction 5 are defined based on the state in which the multifunction peripheral 10 is placed to be usable (the state depicted in FIG. 1). A front direction 6 and a rear direction 7 are defined as a surface of the multifunction peripheral 10 on which an opening 13 is provided is a front surface 22. A right direction 8 and a left direction 9 are defined as the multifunction peripheral 10 is viewed from the front surface 22. The upper direction 4 is a direction opposite to the lower direction 5. The front direction 6 is a direction opposite to the rear direction 7. The right direction 8 is a direction opposite to the left direction 9. The upper direction 4 is perpendicular to the front direction 6 and the right direction 8, and the front direction 6 is orthogonal to the right direction 8. In the following explanation, a direction along the upper direction 4 and the lower direction 5 is referred to as "an upper-lower direction", a direction along the front direction 6 and the rear direction 7 is referred to as "a front-rear direction", and a direction along the right direction 8 and the left direction 9 is referred to as "a left-right direction".

Entire Structure of Multifunction Peripheral 10

As depicted in FIG. 1, the multifunction peripheral 10 includes a scanner unit 11, which reads an image recorded on a document to obtain image data, on its upper side, and a printer unit 12 (an exemplary image recording apparatus), which records an image on a sheet 15 (an exemplary sheet, see FIG. 2) based on the image data or the like, on its lower side.

The scanner unit 11 is formed as a so-called flatbed scanner. The detailed explanation of configuration of the scanner unit 11 is omitted here. The printer unit 12 includes a conveyance unit and a recording unit 24 (see FIG. 2) recording an image on the sheet 15.

Figure 2:
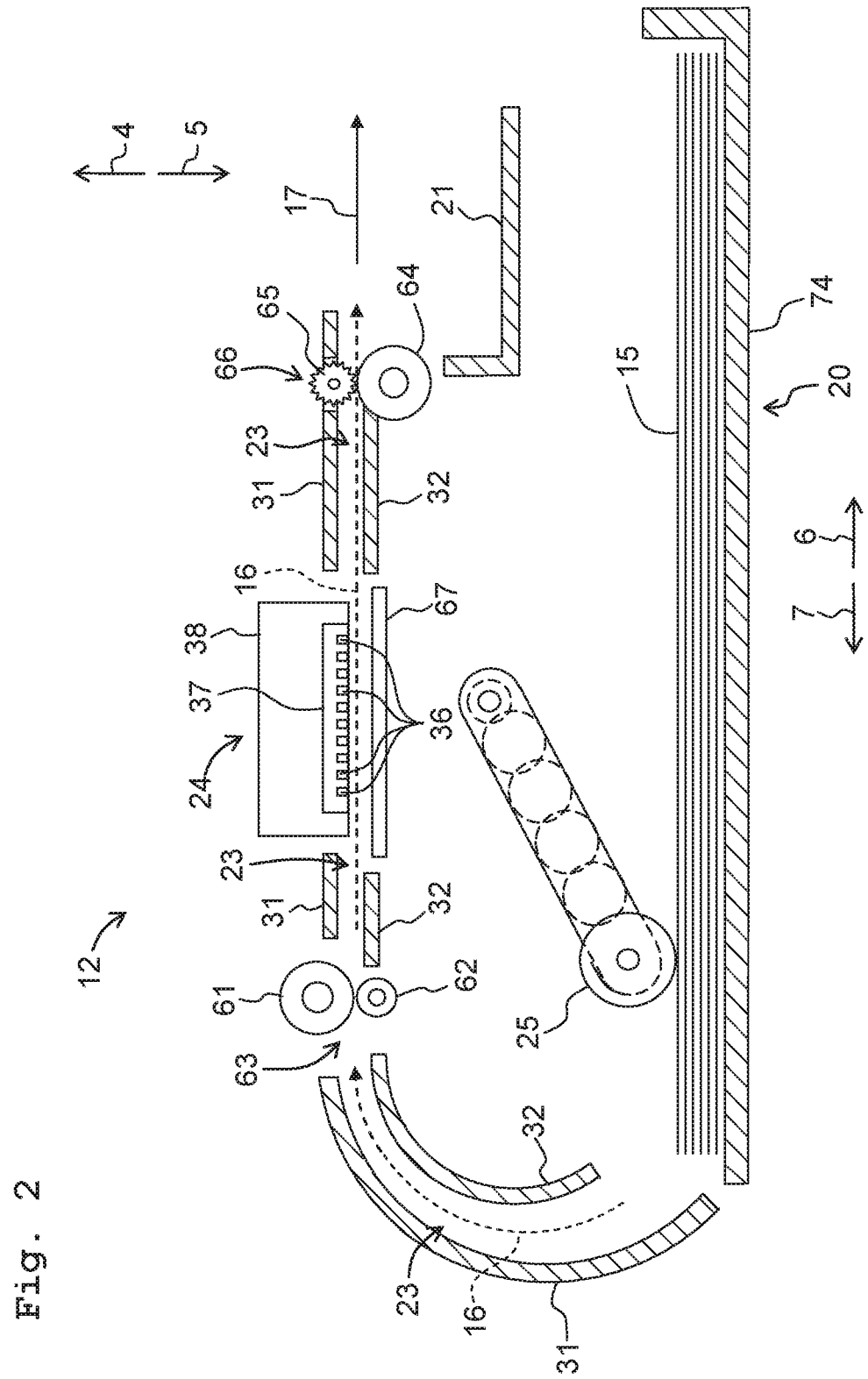
FIG. 2 is a vertical cross-sectional view schematically depicting an internal structure of a printer unit 12.

As depicted in FIGS. 1 and 2, the conveyance unit includes a casing 14 (an exemplary apparatus body) provided with a conveyance path 23 through which the sheet 15 is conveyed, two-tier feed trays 19, 20, a feed roller 25, a conveyance roller pair 63, a discharge roller pair 66, and a discharge tray 21 (an exemplary sheet tray) supported by the feed tray 20.

As depicted in FIG. 1, the casing 14 includes the opening 13 in the front surface 22. The feed tray 20 can be inserted into the casing 14 through the opening 13 in the rear direction 7. The feed tray 20 installed in the casing 14 (the feed tray 20 in the state depicted in FIG. 1) can be pulled out of the casing 14 through the opening 13 in the front direction 6. The feed tray 20 can accommodate sheets 15 of various sizes.

As depicted in FIG. 2, the feed tray 20 includes a bottom plate 74 supporting the sheet 15 and side plates (not depicted in the drawings) provided to stand upward at the left and right ends of the bottom plate 74. The sheet 15 supported by the bottom plate 74 is conveyed to the conveyance path 23 by the feed roller 25 which rotates by receiving the driving force transmitted from a motor (not depicted in the drawings).

In this embodiment, the feed tray 19 is disposed below the feed tray 20. The structure of the feed tray 19 is substantially the same as that of the feed tray 20. Namely, the feed tray 19 includes the bottom plate and side plates. The function of the feed tray 19 is similar to that of the feed tray 20. Namely, the operation of the printer unit 11 performed when an image is recorded on the sheet 15 accommodated in the feed tray 19 is similar to the operation of the printer unit 11 performed. when an image is recorded on the sheet 15 accommodated in the feed tray 20. From these facts, illustration of the feed tray 19 is omitted in drawings except for FIG. 1. Further, in the following description, although explanation of the feed tray 20 will be made, explanation of the feed tray 19 will be omitted.

The conveyance path 23 extends from the rear end of the feed tray 20, as a base point, from the lower side toward the upper side while making a U-turn, extends in the front direction 6, and then reaches the discharge tray 21. The conveyance path 23 is a space defined by a first guide member 31 and a second guide member 32 facing each other with a predetermined interval intervening therebetween. The sheet 15 is fed from the feed tray 20 to the conveyance path 23, and then is conveyed through the conveyance path 23 in a conveyance direction 16 which is a direction indicated by a dashed arrow in FIG. 2.

The conveyance roller pair 63 and the discharge roller pair 66 are provided in the casing 14. In particular, the conveyance roller pair 63 is provided on the upstream side of the recording unit 24 arranged in the conveyance path 23 in the conveyance direction 16. The conveyance roller pair 63 includes a conveyance roller 61 and a pinch roller 62. The pinch roller 62 is biased to make contact with the roller surface of the conveyance roller 61 by use of an elastic member (not depicted in the drawings such as a spring. The discharge roller pair 66 is provided on the downstream side of the recording unit 24 arranged in the conveyance path 23 in the conveyance direction 16. The discharge roller pair 66 includes a discharge roller 64 and a spur 65. The spur 65 is biased to make contact with the roller surface of the discharge roller 64 by use of an elastic member (not depicted in the drawings) such as a spring. The conveyance roller 61 and the discharge roller 64 rotate by receiving the driving force transmitted from a motor (not depicted in the drawings), thereby conveying the sheet 15 in the conveyance direction 16 while nipping the sheet 15 between the conveyance roller 61 and the pinch roller 62 and between the discharge roller 64 and the spur 65.

The recording unit 24 is provided in the casing 14. In particular, the recording unit 24 is disposed above the conveyance path 23. The recording unit 24 includes a recording head 37 and a carriage 38 currying the recording head 37. The recording head 37 includes nozzles 36 from Which inks supplied from ink cartridges (not depicted in the drawings) are jetted to a platen 67. The platen 67, which is a plate-like member supporting the sheet 15 conveyed through the conveyance path 23, is disposed to face the recording head 37 on the lower side of the conveyance path 23. The carriage 38 is supported by a frame provided in the casing 14 to be reciprocable in the left-right direction. Ink droplets are jetted from nozzles 36 to the sheet 15, which is conveyed through the conveyance path 23 while being supported by the platen 67, during the reciprocating movement of the carriage 38. Accordingly, an image is recorded on the sheet 15. In this embodiment, the recording unit 24 records an image on the sheet 15 in accordance with an ink-jet recording system, but the system recording an image is not limited to the ink-jet recording system, and any system such as an electrophotographic system may be adopted.

The discharge tray, which is supported by the feed tray 20, can be inserted into and pulled out of the casing 14 integrally with the feed tray 20. In a state that the feed tray 20 is installed in the casing 14, that is, when the feed tray 20 is in the state depicted in FIG. 1, the feed tray 20 is supported by the frame constituting the casing 14. Namely, the discharge tray 21 is supported by the casing 14 via the teed tray 20. The discharge tray 21 may be supported directly by the casing 14 without the feed tray 20.

The feed roller 25 feeds the sheet 15 supported by the feed tray 20 to the conveyance path 23. The conveyance roller pair 63 conveys the sheet 15 fed to the conveyance path 23 to the recording unit 24. The recording unit 24 records an image on the sheet 15. The discharge roller pair 66 conveys the sheet 15 for which the image is recorded in the front direction 6 and discharges the sheet 15 on the discharge tray 21. The discharge tray 21 supports the sheet 15.

Discharge Tray 21

As depicted in FIGS. 3 to 6, the discharge tray 21 includes a body tray 80, a first tray 81, a second tray 82, and a third tray 83.

Left and right ends (in particular, side plates 89 as described later) of the body tray 80 are supported by the side plates not depicted in the drawings) provided to stand upward at left and right ends of the bottom plate 74 of the feed tray 20. The first tray 81 is movably supported by the body tray 80 in the front-rear direction. The first tray 81 is pulled from the body tray 80 in the front direction 6 (an exemplary first direction) as the discharge direction of the sheet 15 and is housed in the rear direction 7. The second tray 82 is movably supported by the first tray 81 in the front-rear direction. The second tray 82 is pulled from the first tray 81 in the front direction 6 and is housed in the rear direction 7.

Figure 5A:
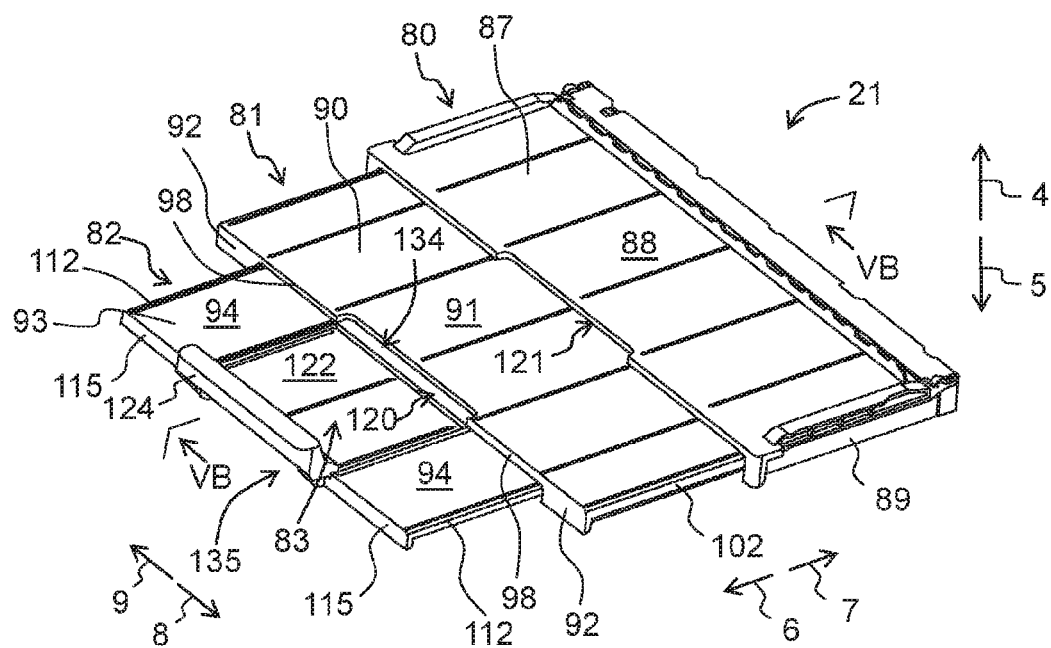
Figure 5B:
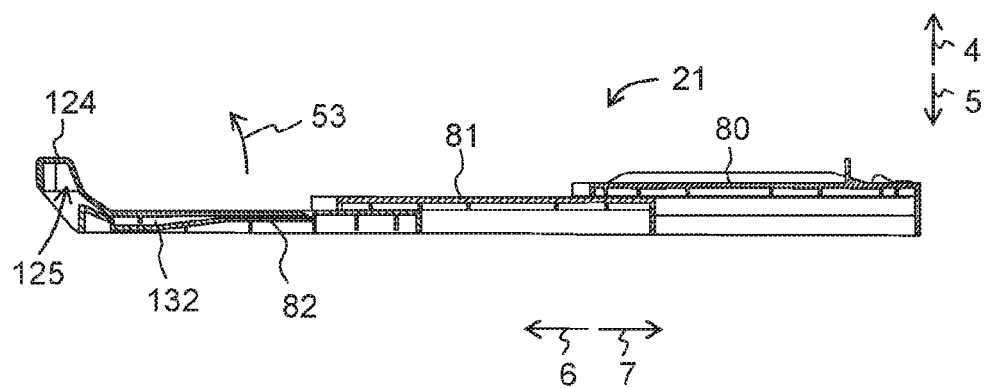
Figure 6A:
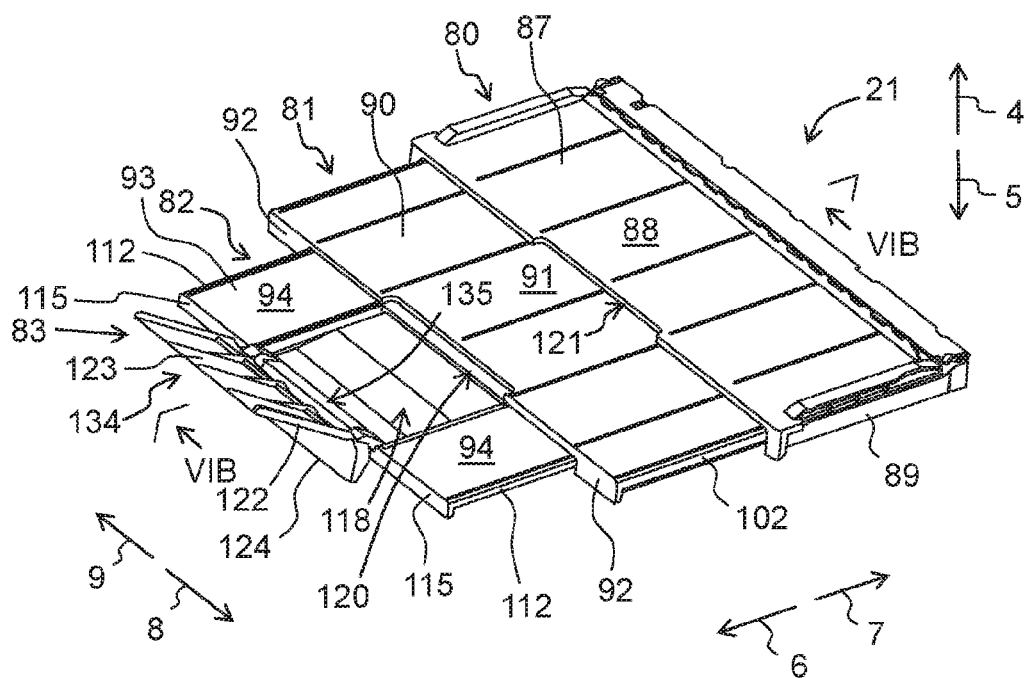
Figure 6B:
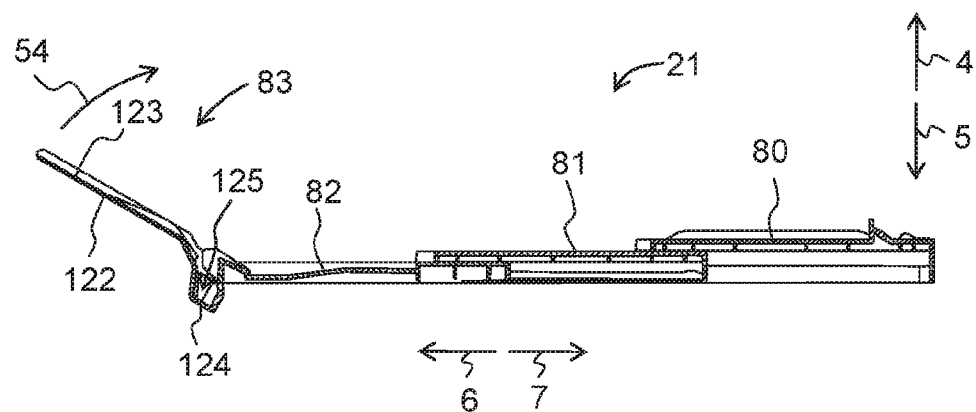
Figure 7:
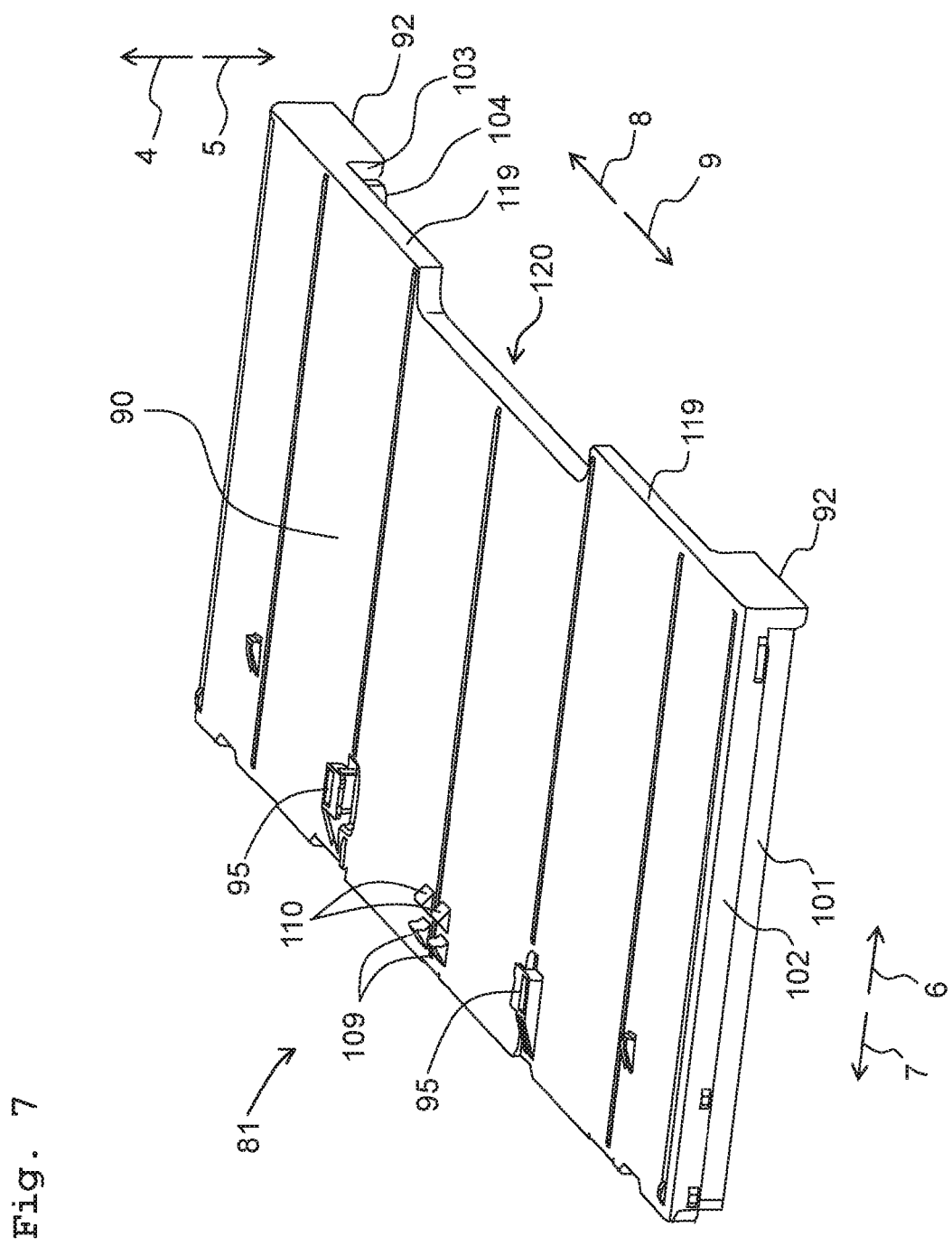
FIG. 7 is a perspective view of the first tray 81 as viewed from above.
Figure 8:
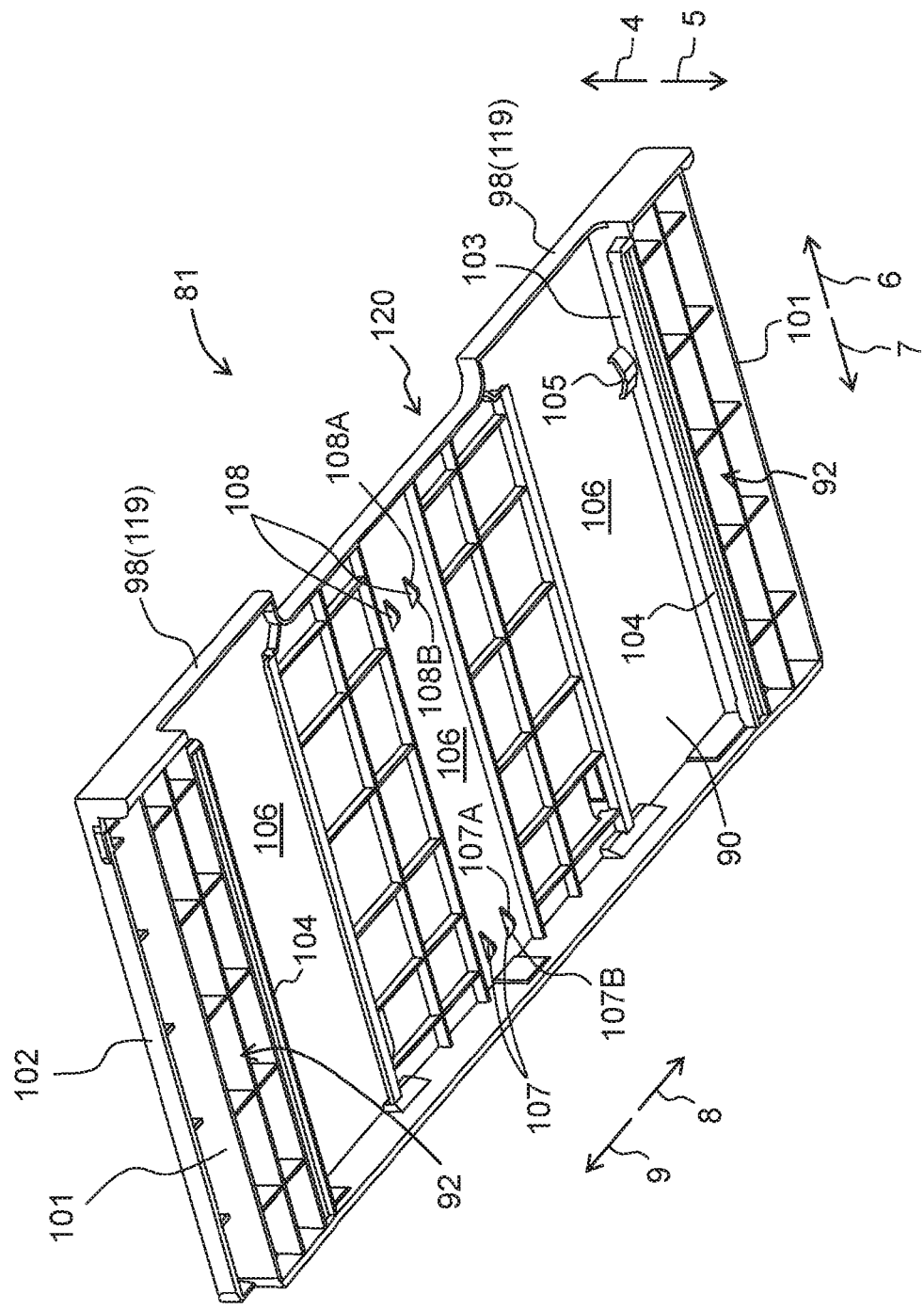
FIG. 8 is a perspective view of the first tray 81 as viewed from below.

The third tray 83 is pivotally supported by the second tray 82 between a first pivoting position depicted in FIG. 5 and a second pivoting position depicted in FIG. 6. The third tray 83 in the first pivoting position pivots in the direction indicated by an arrow 53 (see FIG. 5), thereby reaching the second pivoting position. The third tray 83 in the second pivoting position pivots in the direction indicated by an arrow 54 (see FIG. 6), thereby reaching the first pivoting position.

Figure 3A:
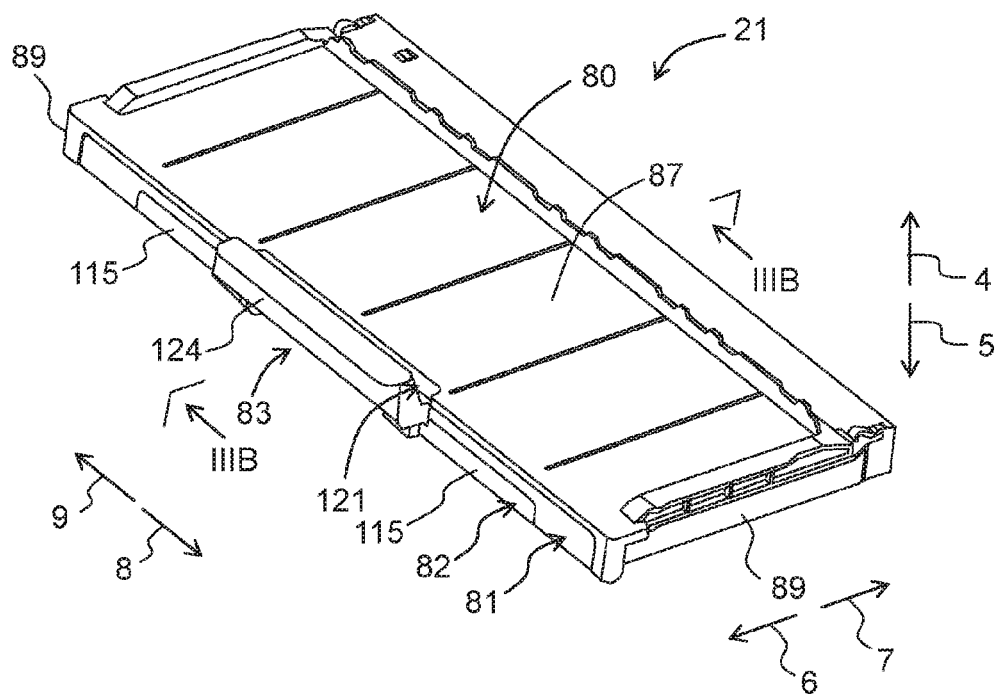
Figure 3B:
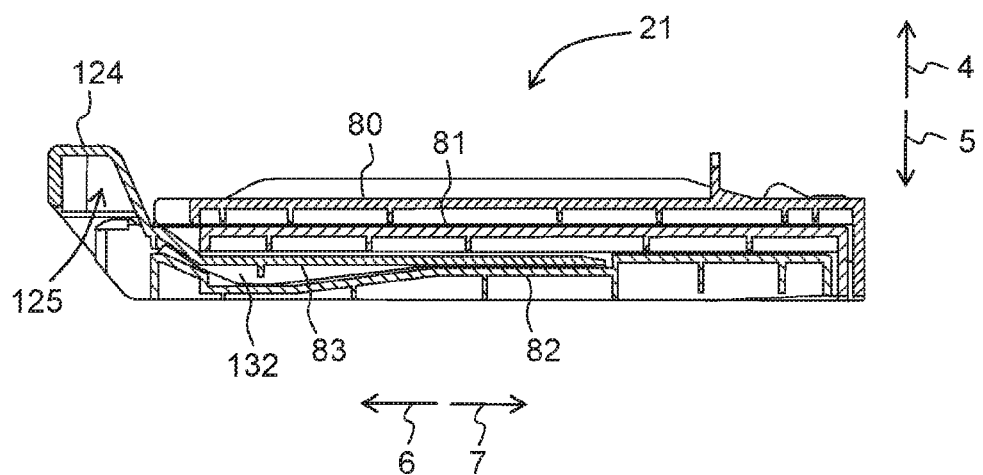
Figure 4A:
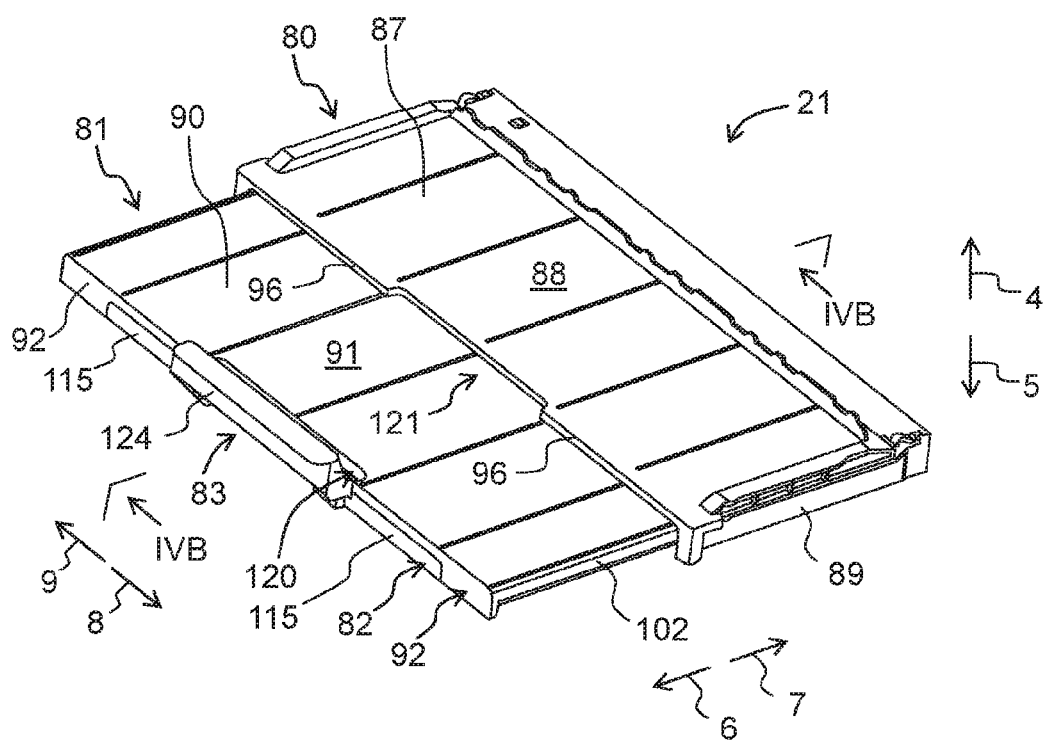
Figure 4B:
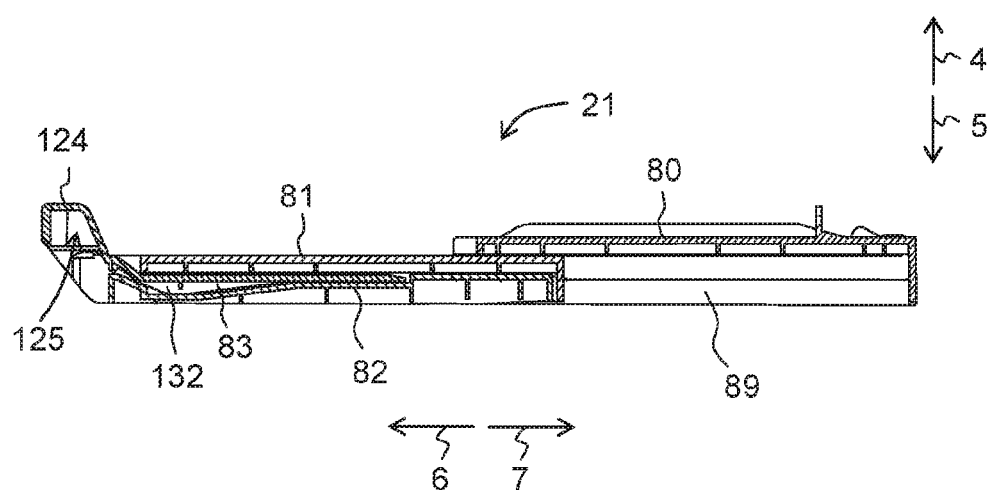

As depicted in FIG. 4A, the first tray 81 covers the second tray 82 from above in a state that the second tray 82 is housed in the first tray 81. As depicted in FIG. 3A, the body tray 8C) covers the first tray 81 from above and the first tray 81 covers the second tray 82 from above in a state that the first tray 81 is housed in the body tray 80 and the second tray 82 is housed in the first tray 81.

When image recording is performed on a small sheet 15, such as a postcard and an L-size photo paper, the discharge tray 21 is used in the state depicted in FIG. 3A. Namely, the discharge tray 21 supports the sheet 15 discharged from the inside of the casing 14 in the front direction 6 only by an upper surface 88 of a support plate 87 (as described later) of the body tray 80, with the second tray 82 being housed in the first tray 81, the first tray 81 being housed in the body tray 80.

When image recording is performed on a sheet 15 having a size larger than the sheet discharged in the state depicted in FIG. 3A, such as A4 size and a letter size, the discharge tray 21 is used in the state depicted in FIG. 4A. In this situation, the first tray 81 is pulled from the body tray 80, but the second tray 82 is housed in the first tray 81. The discharge tray 21 supports the sheet 15 discharged from the inside of the casing 14 in the front direction 6 by the upper surface 88 and an upper surface 91 (an exemplary first support surface) of a support plate 90 (as described later) of the first tray 81.

When image recording is performed on a sheet 15 having a size larger than the sheet discharged in the state depicted in FIG. 4A, such as B4 size and a legal size, the discharge tray 21 is used in the state depicted in FIG. 5A. In this situation, the first tray 81 is pulled from the body tray 80, the second tray 82 is pulled from the first tray 81, and the third tray 83 is in the first pivoting position. The discharge tray 21 supports the sheet 15 discharged from the inside of the casing 14 in the front direction 6 by the upper surface 88, the upper surface 91, an upper surface 94 (an exemplary second support surface) of a support plate 93 (as described later) of the second tray 82, and a surface 122 (an exemplary third support surface) of the third tray 83.

When image recording is performed on a sheet 15 having a size larger than the sheet discharged in the state depicted in FIG. 5A, such as A3 size and a ledger size, the discharge tray 21 is used in the state depicted in FIG. 6A. In this situation, the first tray 81 is pulled from the body tray 80, the second tray 82 is pulled from the first tray 81, and the third tray 83 is in the second pivoting position. The discharge tray 21 supports the sheet 15 discharged from the inside of the casing 14 in the front direction 6 by the upper surface 88, the upper surface 91, the upper surface 94, and a back surface 123 (in particular, first ribs 131 and second ribs 132 which are formed in the back surface 123 and will be described later) of the third tray 83.

First Tray 81

As depicted in FIGS. 4A, 4B, 7, and 8, the first tray 81 includes the support plate 90 which is a plate-like member of which thickness direction includes the upper-lower direction and side parts 92 which extend from left and right ends of the support plate 90 in the lower direction 5. The upper surface 91 of the support plate 90 extends in the front-rear direction and the left-right direction to support the sheet 15 discharged from the multifunction peripheral 10.

The side parts 92 have outer surfaces 101 (a right surface of the right side part 92 and a left surface of the left side part 92) in the left-right direction, respectively. Each of the outer surfaces 101 is provided with an outside extending part 102 protruding in the right direction 8 or left direction 9 and extending in the front-rear direction.

The side parts 92 have inner surfaces 103 (a left surface of the right side part 92 and a right surface of the left side part 92) in the left-right direction, respectively. Each of the inner surfaces 103 is provided with an inside extending part 104 protruding in the right direction 8 or left direction 9 and extending in the front-rear direction.

Each of the inner surfaces 103 includes an inside protrusion 105 which protrudes in the right direction 8 or left direction 9 and is positioned above one of the inside extending parts 104. The inside protrusions 105 face the inside extending parts 104 in the upper-lower direction.

A lower surface 106 of the support plate 90 includes first downward protrusions 107 and second downward protrusions 108 protruding in the lower direction 5. The first downward protrusions 107 are provided in a rear end of the support plate 90. The second downward protrusions 108 are provided in a front end of the support plate 90. The positions of the first downward protrusions 107 in the left-right direction are identical to the positions of the second downward protrusions 108 in the right direction 8 and the left direction 9.

Each of the first downward protrusions 107 has an inclined surface 107A and an inclined surface 107B, the inclined surface 107A extending from the front end of the first downward protrusion 107 in the rear direction 7 while being inclined in the lower direction 5, the inclined surface 107B extending from the rear end of the first downward protrusion 107 in the front direction 6 while being inclined in the lower direction 5. Each of the second downward protrusions 108 has an inclined surface 108A and an inclined surface 108B, the inclined surface 108A extending from the front end of the second downward protrusion 108 in the rear direction 7 while being inclined in the lower direction 5, the inclined surface 108B extending from the rear end of the second downward protrusion 108 in the front direction 6 while being inclined in the lower direction 5.

The upper surface 91 of the support plate 90 includes first upward protrusions 109 and second upward protrusions 110 protruding in the upper direction 4. The first upward protrusions 109 and second upward protrusions 110 are provided in the rear end of the support plate 90. The first upward protrusions 109 are disposed on the rear side of the second upward protrusions 110. The first upward protrusions 109 face the second upward protrusions 110 in the front-rear direction with a predetermined space intervening therebetween. Here, the predetermined space is substantially equal to a length, of two kinds of protrusions (not depicted in the drawings) respectively provided in the front end and rear end of a lower surface (not depicted in the drawings) of the body tray 80, in the front-rear direction. The two kinds of protrusions provided in the body tray 80 correspond to the first downward protrusions 107 and the second downward protrusions 108 provided in the first tray 81, respectively.

In this embodiment, the first downward protrusions 107, the second downward protrusions 108, the first upward protrusions 109, and the second upward protrusions 110 are each provided as a pair at an interval in the left-right direction. Each of the protrusions 107, 108, 109, 110 may not be provided as a pair, and may have a different arrangement as appropriate. For example, each of the first downward protrusion 107, the second downward protrusion 108, the first upward protrusion 109, and the second upward protrusion 110 may be provided singly or independently.

The support plate 90 includes a concave part 120 (an exemplary second concave part) which is positioned in the front end (a front surface 119 of a front plate 98 of the support plate 90) of the first tray 81 and is recessed in the rear direction 7.

Second Tray 82

Figure 9:
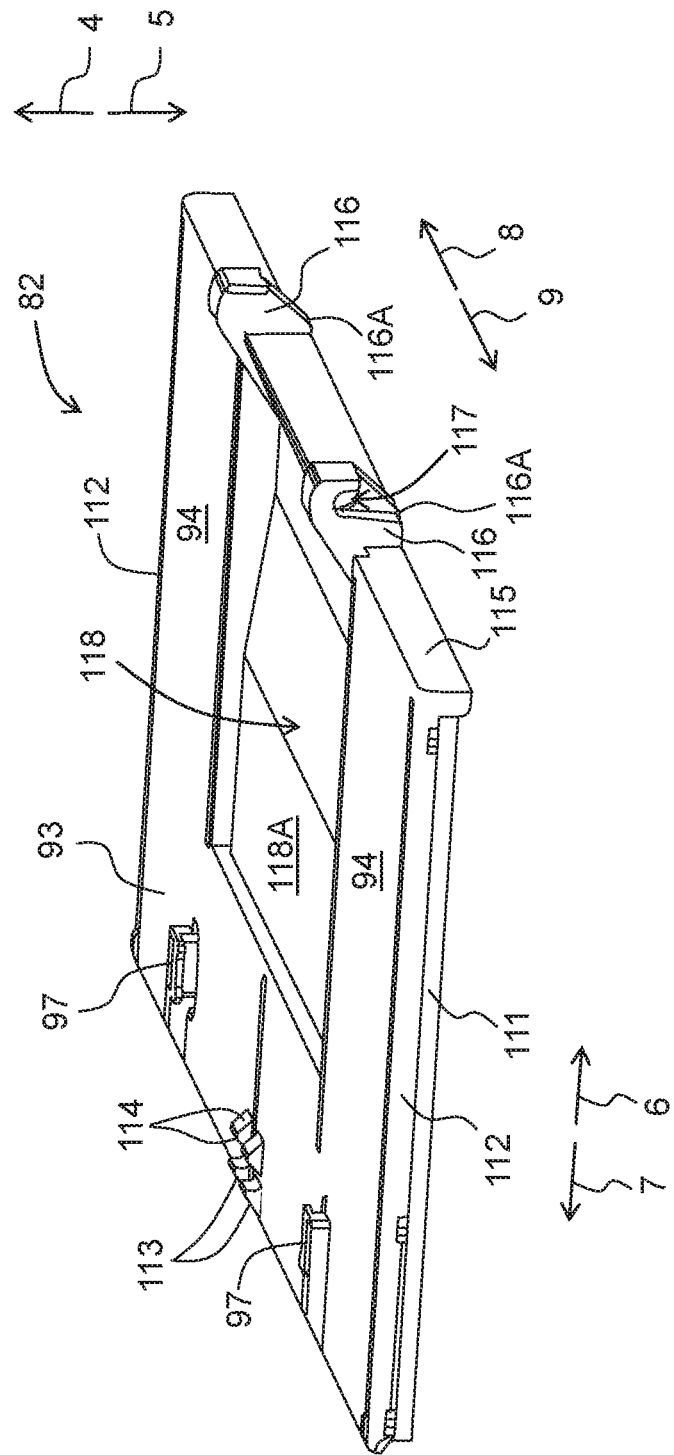
FIG. 9 is a perspective view of the second tray 82 as viewed from above.

As depicted in FIGS. 5A, 5B, and 9, the second tray 82 includes the support plate 93 which is a plate-like member of which thickness direction includes the upper-lower direction. The upper surface 94 of the support plate 93 extends in the front direction 6, rear direction 7, right direction 8, and left direction 9. The upper surface 94 supports the sheet 15 discharged from the multifunction peripheral 10.

Protrusions 116, which are disposed at an interval in the left-right direction to protrude in the front direction 6, are provided in a front surface 115 of the support plate 93. Each protrusion 116 includes a hole 117 passing in the left-right direction.

The upper surface 94 of the support plate 93 includes a concave part 118 (an exemplary first concave part). The concave part 118 is formed in an area extending from the front end of the support plate 93 to the center in the front-rear direction and extending between the protrusions 116 in the left-right direction.

A right surface (not depicted in the drawings) and a left surface 111 of the support plate 93 respectively include outside extending parts 112. Each of the outside extending parts 112 projects in the right direction 8 or left direction 9 and extends in the front-rear direction.

The upper surface 94 of the support plate 93 includes first upward protrusions 113 and second upward protrusions 114 protruding in the upper direction 4. The first upward protrusions 113 and second upward protrusions 114 are provided in a rear end of the support plate 93. The first upward protrusions 113 are disposed on the rear side of the second upward protrusions 114. The first upward protrusions 113 and second upward protrusions 114 are disposed at a predetermined interval in the front-rear direction. Here, the predetermined interval is substantially equal to the length, of the first downward protrusions 107 and the second downward protrusions 108 of the first tray 81, in the front-rear direction.

In this embodiment, the first upward protrusions 113 and the second upward protrusions 114 are each provided as a pair at an interval in the left-right direction. Each of the protrusions 113, 114 may not be provided as a pair and may have a different arrangement as appropriate. For example, each of the first upward protrusion 113 and the second upward protrusion 114 may be provided singly or independently.

In this embodiment, the configuration in Which the second tray 82 is movably supported by the first tray 81 in the front-rear direction is as follows.

The outside extending parts 112 of the second tray 82 are respectively supported by the inside extending parts 104 of the first tray 81 so that the inside protrusions 105 of the first tray 81 respectively make contact with the outside extending parts 112 from above. This allows the outside extending parts 112 to be sandwiched by the inside extending parts 104 and the inside protrusions 105, thereby making it possible to movably support the second tray 82 by the first tray 81 in the front-rear direction.

The second tray 82 is movable between a first position and a second position in the front-rear direction, the first position being depicted in FIG. 4A in which the second tray 82 is housed in the first tray 81, the second position being depicted in FIG. 5A in which the second tray 82 is pulled from the first tray 81. The second tray 82 in the second position is positioned on the front side of the first tray 81.

As depicted in FIG. 4A, when the second tray 82 is in the first position, the second tray 82, which is positioned below the upper surface 91 of the first tray 81, wholly overlaps with the upper surface 91. Namely, the first tray 81 completely covers the second tray 82. When the second tray 82 is in the first position, the first downward protrusions 107 (see FIG. 8) of the first tray 81 are positioned between the first upward protrusions 113 and the second upward protrusions 114 (see FIG. 9) of the second tray 82. In this situation, the first downward protrusions 107 regulate movement of the second tray 82 in the first position in the front-rear direction. Only a part of the second tray 82 in the first position may be positioned below the upper surface 91 of the first tray 81.

As depicted in FIG. 5A, when the second tray 82 is in the second position, only the rear end of the second tray 82, which is positioned below the upper surface 91 of the first tray 81, overlaps with the upper surface 91. Namely, the first tray 81 covers only the rear end of the second tray 82. Thus, an overlapping area of the upper surface 94 of the second tray 82 in the second position and the upper surface 91 is smaller than an overlapping area of the upper surface 94 of the second tray in the first position and the upper surface 91. When the second tray 82 is in the second position, the second downward protrusions 108 (see FIG. 8) of the first tray 81 are positioned between the first upward protrusions 113 and the second upward protrusions 114 (see FIG. 9) of the second tray 82. In this situation, the second downward protrusions 108 regulate movement of the second tray 82 in the second position in the front-rear direction.

When the force in the front direction 6 is applied to the second tray 82 in the first position, the first upward protrusions 113 make contact with the inclined surfaces 107B of the first downward protrusions 107 from the rear side and push them. This bends parts and surroundings, of the first tray 81, making contact with the first upward protrusions 113 in the upward direction 4. As a result, the first upward protrusions 113 pass the first downward protrusions 107, thereby moving the second tray 82 in the front direction 6 relative to the first tray 81. When the second tray 82 in the first position moves in the front direction 6 by a predetermined distance, the second upward protrusions 114 make contact with the inclined surfaces 108B of the second downward protrusions 108 from the rear side and push them. This bends parts and surroundings, of the first tray 81, making contact with the second upward protrusions 114 in the upward direction 4. As a result, the second upward protrusions 114 pass the second downward protrusions 108, thereby positioning the second downward protrusions 108 between the first upward protrusions 113 and the second upward protrusions 114. Namely, the second tray 82 reaches the second position.

When the force in the rear direction 7 is applied to the second tray 82 in the second position, the second upward protrusions 114 make contact with the inclined surfaces 108A of the second downward protrusions 108 from the front side and push them. This bends parts and surroundings, of the first tray 81, making contact with the second upward protrusions 114 in the upward direction 4. As a result, the second upward protrusions 114 pass the second downward protrusions 108, thereby moving the second tray 82 in the rear direction 7 relative to the first tray 81. When the second tray 82 in the second position moves in the rear direction 7 by a predetermined distance, the first upward protrusions 113 make contact with the inclined surfaces 107A of the first downward protrusions 107 from the front side and push them. This bends parts and surroundings, of the first tray 81, making contact with the first upward protrusions 113 in the upward direction 4. As a result, the first upward protrusions 113 pass the first downward protrusions 107, thereby positioning the first downward protrusions 107 between the first upward protrusions 113 and the second upward protrusions 114. Namely, the second tray 82 reaches the first position.

Body Tray 80

As depicted in FIGS. 3 to 6, the body tray 80 includes the support plate 87 which is a plate-like member of which thickness direction includes the upper-lower direction, and side plates 89 which extend from left and right ends of the support plate 87 in the lower direction 5. The upper surface 88 of the support plate 87 extends in the front-rear direction and left-right direction to support the sheet 15 discharged from the multifunction peripheral 10.

The configuration of the body tray 80 is substantially the same as that of the first tray 81. Namely, the body tray 80 includes inside extending parts (not depicted in the drawings) having the same configuration as that of the inside extending parts 104 of the first tray 81, inside protrusions (not depicted in the drawings) having the same configuration as that of the inside protrusions 105 of the first tray 81, and two kinds of downward protrusions (not depicted in the drawings) having the same configurations of those of the first downward protrusions 107 and the second downward protrusions 108 of the first tray 81. Further, the support plate 87 includes a concave part 121 which extends from the front end of the body tray 80 and is recessed in the rear direction 7.

In this embodiment, the configuration in which the body tray 80 movably supports the first tray 81 in the front-rear direction is similar to the configuration in which the first tray 81 movably supports the second tray 82 in the front-rear direction. Thus, any detailed explanation of the body tray 80 will be omitted. Namely, the outside extending parts 102 of the first tray 81 are respectively supported by the inside extending parts of the body tray 80 so that the inside protrusions of the body tray 80 make contact with the outside extending parts 102 from above. The downward protrusions, of two kinds of downward protrusions of the body tray 80, provided on the rear end of the support plate 87 regulate movement of the first tray 81 housed in the body tray 80. The downward protrusions, of two kinds of downward protrusions of the body tray 80, provided on the front end of the support plate 87 regulate movement of the first tray 81 pulled from the body tray 80.

Third Tray 83

Figure 10:
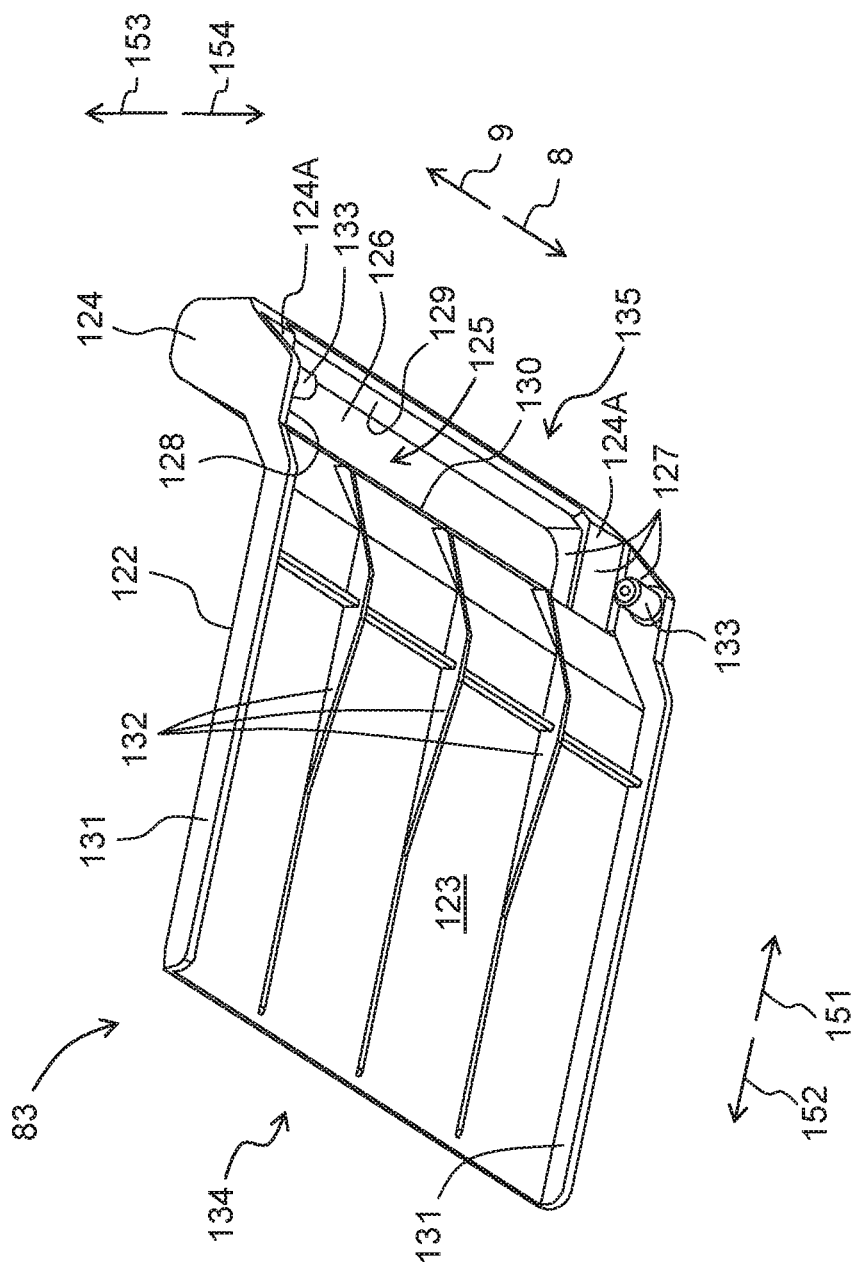
FIG. 10 is a perspective view of the third tray 83 as viewed from below.

As depicted in FIGS. 5, 6, and 10, the third tray 83 is a plate-like member. The third tray 83 includes the surface 122 and a back surface 123 which is a surface opposite to the surface 122.

The surface 122 includes a laterally-long protrusion 124. The third tray 83 is supported by the second tray 82 in a state that the longitudinal direction of the laterally-long protrusion 124 includes the left-right direction. As depicted in FIG. 10, the surface 122 and the back surface 123 extend in the right direction 8, the left direction 9, a first orthogonal direction 151, and a second orthogonal direction 152, the first and second orthogonal directions 151, 152 being orthogonal to the right direction 8. The first orthogonal direction 151 is a direction opposite to the second orthogonal direction 152. The left-right direction are examples of a second direction.

The laterally-long protrusion 124 protrudes, at an end of the surface 122 in the first orthogonal direction 151, in a surface-side protruding direction 153 orthogonal to the right direction 8 and the first orthogonal direction 151. The laterally-long protrusion 124 includes an inner space 125. The inner space 125 is defined by atop surface 126, a right inner surface 127, a left inner surface 128, a first side surface 129, and a second side surface 130. The top surface 126, the right inner surface 127, the left inner surface 128, the first side surface 129, and the second side surface 130 are examples of a grip.

The top surface 126 is disposed at the protruding front end of the laterally-long protrusion 124 to face aback-side protruding direction 154 which is a direction opposite to the surface-side protruding direction 153. The right inner surface 127 and left inner surface 128 extend from the top surface 126 in the back-side protruding direction 154, and they face each other in the left-right direction. The right inner surface 127 faces the left direction 9. The left inner surface 128 faces the right direction 8. The first side surface 129 and the second side surface 130 extend from the top surface 126 in the back-side protruding direction 154, and they face each other in the first orthogonal direction 151 and second orthogonal direction 152. The first side surface 129 faces the second orthogonal direction 152. The second side surface 130 faces the first orthogonal direction 151.

An end of the inner space 125 in the back-side protruding direction 154 is open. Namely, the inner space 125 is accessible through the end thereof In this context, the access means that a user or the like can insert finger(s) or the like into the inner space 125 through the end. A part, of the inner space 125, other than the end may be open. For example, the inner space 125 may be defined such that the end in the back-side protruding direction 154 is closed and an end in the second orthogonal direction 152 is open without the second side surface 130.

The back surface 123 includes first ribs 131 and second ribs 132. The first ribs 131 and second ribs 132, which protrude in the back-side protruding direction 154, extend in the first orthogonal direction 151 and the second orthogonal direction 152. The first ribs 131 are formed at right and left ends of the back surface 123. Three second ribs 132 are provided between the right end and the left end of the back surface 123 at intervals in the left-right direction. The number of second ribs 132, however, is not limited to three. The protruding length of the first rib 131 in the back-side protruding direction 154 is longer than the protruding length of the second rib 132 in the back-side protruding direction 154.

Shafts 133 (an exemplary pivoting shaft) extending in the left-right direction are formed in the right inner surface 127 and left inner surface 128, respectively. Each of the shafts 133 is inserted into the hole 117 (see FIG. 9) formed in one of the protrusions 116 of the second tray 82. Accordingly, the third tray 83 is supported by the second tray 82 to pivot around the shafts 133 between the first pivoting position depicted in FIG. 5A and the second pivoting position depicted in FIG. 6A.

As depicted in FIG. 5A, when the third tray 83 is in the first pivoting position, a part, of the third tray 83, other than the laterally-long protrusion 124 is housed in the concave part 118 of the second tray 82 (see FIGS. 6A and 9), that is, the third tray 83 is supported by a bottom surface 118A (see FIG. 9) of the concave part 118. In this situation, the surface 122 of the third tray 83 is substantially parallel to the upper surface 94 of the support plate 93 of the second tray 82. In this embodiment, the surface 122 and the upper surface 94 are on the same plane. Namely, the first orthogonal direction 151 coincides with the front direction 6, the second orthogonal direction 152 coincides with the rear direction 7, the surface-side protruding direction 153 coincides with the upper direction 4, and the back-side protruding direction 154 coincides with the lower direction 5. Further, when the third tray 83 is in the first pivoting position, a pivoting front end 134 of the third tray 83 is positioned on the rear side of the shafts 133. Thus, the surface 122 supports the sheet 15 discharged from the inside of the casing 14 in the front direction 6 in cooperation with the upper surface 88, upper surface 91, and upper surface 94, with the first tray 81 being pulled from the body tray 80, the second tray 82 being pulled from the first tray 81, the third tray 83 being in the first pivoting position. The back surface 123 facing downward does not support the sheet 15.

When the third tray 83 is in the first pivoting position, the protruding front end of the laterally-long protrusion 124 is positioned above all of the upper surface 88, upper surface 91, and upper surface 94. Thus, the sheet 15 discharged from the inside of the casing 14 in the front direction 6 makes contact with the laterally-long protrusion 124 and is stopped thereby.

As depicted in FIG. 6A, when the third tray 83 is in the second pivoting position, the third tray 83 obliquely extends from the front end of the second tray 82 in the front direction 6 and upper direction 4. In this situation, the back surface 123 faces upward, the surface 122 faces downward, and the pivoting front end 134 is positioned on the front side of the shafts 133. Thus, the first ribs 131 and second ribs 132 of the back surface 123 support the sheet 15 discharged from the inside of the casing 14 in the front direction 6 in cooperation with the upper surface 88, upper surface 91, and upper surface 94, with the first tray 81 being from the body tray 80, the second tray 82 being pulled from the first tray 81, the third tray 83 being in the second pivoting position. Namely, a virtual plane passing the protruding end surface of the first ribs 131 and second ribs 132 is an exemplary fourth support surface.

Note that, since the protruding length of the second ribs 132 is shorter than that of the first ribs 131, the center of the virtual plane in the left-right direction is recessed further than both ends of the virtual plane in the left-right direction. Thus, the sheet 15 supported by the first ribs 131 and the second ribs 132 curves in the left-right direction such that the center is recessed further than both ends in the left-right direction.

As described above, when the third tray 83 is in the second pivoting position, the third tray 83 obliquely extends from the front end of the second tray 82 in the front direction 6 and upper direction 4. Namely, the virtual plane is inclined relative to the upper surface 94 of the second tray 82 so that the pivoting front end 134 of the third tray 83 is positioned above a pivoting base end 135 with the third tray 83 being in the second pivoting position.

When the third tray 83 is in the second pivoting position, the laterally-long protrusion 124 protrudes downward from the surface 122 facing downward. Thus, the sheet 15 discharged from the inside of the casing 14 in the front direction 6 has no contact with the laterally-long protrusion 124.

When the third tray 83 is in the second pivoting position, contact surfaces 124A (see FIG. 10) of the laterally-long protrusion 124 make contact with lower ends 116A (see FIG. 9) of the protrusions 116 of the second tray 82, thereby preventing the third tray 83 in the second pivoting position from pivoting further in the direction indicated by the arrow 53 (see FIG. 5B).

When the second tray 82 is in the first position and the third tray 83 is in the first pivoting position, all parts, of the third tray 83, other than the laterally-long protrusion 124 are positioned below the upper surface 91 of the first tray 81 to overlap with the upper surface 91. Namely, the first tray 81 covers all parts, of the third tray 83, other than the laterally-long protrusion 124. Thus, the third tray 83 in this situation can not pivot from the first pivoting position to the second pivoting position. When the second tray 82 is in the first position and the third tray 83 is in the first pivoting position, the laterally-long protrusion 124 is positioned in the concave part 120 of the first tray 81. Note that at least a part, of the third tray 83 in the first pivoting position, other than the laterally-long protrusion 124 may be positioned below the upper surface 91 of the third tray 81.

When the second tray 82 is in the second position, the third tray 83 does not overlap with the upper surface 91 of the first tray 81. Thus, the third tray 83 is pivotable between the first pivoting position and the second pivoting position.

Pull-out Operation

In the following, an explanation will be made about an operation in which a user of the multifunction peripheral 10 pulls the first tray 81 and second tray 82 from the body tray 80 while gripping the laterally-long protrusion 124 of the third tray 83 and pivots the third tray 83 from the first pivoting position to the second pivoting position, with reference to FIGS. 3A to 6.

In the state depicted in FIG. 3A, the trays 81, 82, and 83 are housed in the body tray 80. The concave part 120 of the first tray 81 and the concave part 121 of the body tray 80 are in the same position as viewed in planer view. Namely, the concave parts 120, 121 form one concave part. The laterally-long protrusion 124 of the third tray 83 is positioned in the one concave part formed by the concave parts 120, 121.

In the state depicted in FIG. 3A, when the user inserts finger(s) into the inner space 125 from the lower side of the laterally-long protrusion 124 and presses the linger(s) against the first side surface 129, the laterally-long protrusion 124 is pulled in the front direction 6. Namely, the laterally-long protrusion 124 is pulled in the front direction 6 in a state that the first side surface 129 is connected to the user's finger(s). This causes the force in the front direction 6 acting on the trays 81, 82, and 83, thereby moving the trays 81, 82, and 83 in the front direction 6 relative to the body tray 80. Accordingly, the surface (the first side surface 129 in this embodiment) defining the inner space 125 of the laterally-long protrusion 124 is gripped to move the trays 81, 82, and 83.

The movement of the first tray 81 relative to the body tray 80 in the front-rear direction is regulated by engaging the upward protrusions 109, 110 (see FIG. 7) of the first tray 81 with downward protrusions (not depicted in the drawings) provided in the rear end of the support plate 87 of the body tray 80. The movement of the second tray 82 relative to the first tray 81 in the front-rear direction is regulated by engaging the upward protrusions 113, 114 (see FIG. 9) of the second tray 82 with the first downward protrusions 107 (see FIG. 8) of the first tray 81. The force regulating the movement of the first tray 81 relative to the body tray 80 is smaller than the force regulating the movement of the second tray 82 relative to the first tray 81. The two kinds of regulating force may have different degrees, for example, by making the inclination angle of the downward protrusions of the body tray 80 different from the inclination angle(s) of the downward protrusions 107, 108 of the first tray 81. Thus, when the laterally-long protrusion 124 in the state depicted in FIG. 3A is pulled in the front direction 6, the first tray 81, second tray 82, and third tray 83 move integrally in the front direction 6 to become the state depicted in FIG. 4A.

When the laterally-long protrusion 124 in the state depicted in FIG. 4A is pulled in the front direction 6, the second tray 82 moves in the front direction 6 relative to the first tray 81. In the state depicted in FIG. 4A, the movement of the first tray 81 in the front direction 6 is regulated by making protrusions 95 (see FIG. 7) of the upper surface 91 of the first tray 81 contact with a front plate 96 (see FIG. 4) extending downward from the front end of the support plate 87 of the body tray 80 from the rear side. Thus, when the laterally-long protrusion 124 in the state depicted in FIG. 44 is pulled in the front direction 6, the second tray 82 and third tray 83 move integrally in the front direction 6 to become the state depicted in FIG. 5A.

A part, of the laterally-long protrusion 124, gripped by the user (the first side surface 129 in this embodiment) is positioned on the front upper side of the shafts 133 of the third tray 83, with the third tray 83 being in the first pivoting position. Thus, when the force in the front direction 6 is applied to the first side surface 129 in the state depicted in FIG. 5A, the third tray 83 pivots in the direction indicated by the arrow 53. Namely, the third tray 83 pivots from the first pivoting position to the second pivoting position to become the state depicted in FIG. 6A. In the state depicted in FIG. 54, the movement of the second tray 82 in the front direction 6 is regulated by making protrusions 97 (see FIG. 9) of the upper surface 94 of the second tray 82 contact with a front plate 98 (see FIG. 5) extending downward from the front end of the support plate 90 of the first tray 81 from the rear side.

Effects of Embodiment

In this embodiment, the sheet 15 is supported by the upper surface 88, upper surface 91, upper surface 94, and surface 122 with the second tray 82 being in the second position, the third tray 83 being in the first pivoting position. In this situation, the sheet 15 discharged in the front direction 6 makes contact with the laterally-long protrusion 124 and is stopped thereby. This prevents the sheet 15 from falling from the discharge tray 21.

The sheet 15 is supported by the upper surface 88, upper surface 91, upper surface 94, and back surface 123 with the second tray 82 being in the second position, the third tray 83 being in the second pivoting position. The pivoting front end 134 of the third tray 83 in the state that the third tray 83 is in the second pivoting position is positioned on the downstream side, in the front direction 6, of the pivoting front end 134 of the third tray 83 in the state that the third tray 83 is in the first pivoting position. Further, the third tray 83 in the second pivoting position extends from the second tray 82 in the front direction 6. Thus, the third tray 83 in the second pivoting position can support the sheet 15 having a larger size as compared with the case in which the third tray 83 is in the first pivoting position.

The back surface 123 has no laterally-long protrusion 124. Thus, even when a sheet 15 of which length in the front-rear direction is longer than the total length of the upper surface 88, upper surface 91, upper surface 94, and back surface 123 is discharged, the sheet 15 is not stopped at an inappropriate position. This reduces the possibility of jam of the sheet 15 in the casing 14.

In this embodiment, applying the force in the front direction 6 while gripping an upper part of the laterally-long protrusion 124 moves the second tray 82 from the first position to the second position. When the second tray 82 has reached the second position, the third tray 83 pivots from the first pivoting position to the second pivoting position due to the force in the front direction 6 applied to the upper part of the laterally-long protrusion 124. Namely, in this embodiment, the third tray 83 can pivot from the first pivoting position to the second pivoting position in conjunction with the movement of the second tray 82 from the first position to the second position.

In this embodiment, the user accesses the inner space 125 from the outside by touching the first side surface 129 defining the inner space 125 with his/her finger(s), thereby getting his/her finger(s) caught in the laterally-long protrusion 124. Accordingly, the user moves the second tray 82 easily while gripping the laterally-long protrusion 124.

In this embodiment, the sheet 15 supported by the first ribs 131 and second ribs 132 curves in the left-right direction. This makes the sheet 15 difficult to curve in the front direction 6. As a result, even if the discharged sheet 15 extends beyond the first ribs 131 and second ribs 132 in the front direction 6, the sheet 15 is less likely to fall from the discharge tray 21.

In this embodiment, since the back surface 123 is inclined, it is possible to reduce the possibility that the sheet 15 discharged in the front direction 6 passes the back surface 123 and falls from the discharge tray 21.

In this embodiment, since the third tray 83 in the first pivoting position is housed in the concave part 118, it is possible to reduce the entire thickness of the second tray 82 and the third tray 83 in the state that the third tray 83 is in the first pivoting position. Further, the upper surface 94 may be flush with the surface 122 in the state that the third tray 83 is in the first pivoting position. This prevents the sheet 15, which is discharged along the upper surface 94 and surface 122 in the front direction 6, from being caught by the level difference between the upper surface 94 and the surface 122.

In this embodiment, positioning the laterally-long protrusion 124 in the concave part 120 in the state that the second tray 82 is in the first position and the third tray 83 is in the first pivoting position reduces the length of the discharge tray 21 in the front direction 6.

Modified Embodiments

In the embodiment, the concave part 118 is formed on the upper surface 94 of the support plate 93 of the second tray 82 and the third tray 83 in the first pivoting position is housed in the concave part 118. However, the third tray 83 in the first pivoting position may be housed in any other part than the concave part 118. For example, the support plate 93 may include an opening or notch instead of the concave part 118, and the third tray 83 in the first pivoting position may be housed in the opening or notch. In this case, the opening or notch includes support parts (e.g. protrusions which protrude from side surfaces defining the opening or notch) supporting the third tray 83 in the first pivoting position. The support plate 93 may not include the concave part 118, opening, notch, and the like. In this case, the third tray 83 in the first pivoting position is supported by the upper surface 94 of the support plate 93.

The back surface 123 of the third tray 83 may not include the first ribs 131 and second ribs 132. In this case, the back surface 123 supports the sheet 15. Namely, the back surface 123 is an exemplary fourth support surface. Further, in this case, the back surface 123 may be a flat surface or may curve such that the center in the left-right direction is recessed.

In the embodiment, the trays are configured to be two-tiered by being pulled. Specifically, the first tray 81 is pulled from the body tray 80 and the second tray 82 is pulled from the first tray 81 However, the number of tiers of trays to be pulled is not limited to two. In this case, the number of trays provided for the discharge tray 21 depends on the number of tiers of trays to be pulled.

In the embodiment, the explanation has been made by citing the discharge tray 21, on which a sheet having an image recorded thereon by the printer unit 12 is discharged, as an exemplary sheet tray of the present teaching. The sheet tray of the present teaching is not limited to the discharge tray 21. For example, the sheet tray of the present teaching may be a tray on which a sheet, which has been subjected to image reading by the scanner unit 11, is discharged. Thus, the conveyance unit including the sheet tray of the present teaching may be provided in any other part (e.g. scanner unit 11) than the printer unit 12.

What is claimed is:

1. A sheet tray configured to support a sheet, comprising:
a first tray including a first support surface configured to support the sheet discharged from an apparatus body in a first direction;
a second tray including a second support surface configured to support the sheet and being supported by the first tray to be movable between a first position and a second position in the first direction, the first position being a position in which at least apart of the second support surface positioned below the first support surface overlaps with the first support surface, the second position being a position which is located in the first direction more than the first position, and an overlapping area of the first support surface and the second support surface that is located in the second position is smaller than an overlapping area of the first support surface and the second support surface that is located in the first position; and a third tray pivotally supported by the second tray and configured to pivot between a first pivoting position and a second pivoting position, the first pivoting position being a position in which a pivoting front end of the third tray is positioned on an upstream side of a pivoting shaft of the third tray in the first direction, the second pivoting position being a position in which the pivoting front end is positioned on a downstream side of the pivoting shaft in the first direction to extend beyond the second tray in the first direction, wherein the third tray includes a third support surface configured to support the sheet in cooperation with the second support surface with the third tray being in the first pivoting position and a fourth support surface being a back surface of the third support surface and configured to support the sheet in cooperation with the second support surface with the third tray being in the second pivoting position, the third support surface includes a protrusion which protrudes upward to be positioned above the first support surface in a state that the third tray is in the first pivoting position; and the third tray overlaps with the first support surface in a state that the second tray is in the first position and that at least a part, of the third tray, except for the protrusion is positioned below the first support surface, and the third tray does not overlap with the first support surface in a state that the second tray is in the second position.

2. The sheet tray according to claim 1, wherein the protrusion includes a grip which is gripped to move the second tray, wherein the grip is provided above the pivoting shaft of the third tray in the state that the third tray is in the first pivoting position.

3. The sheet tray according to claim 2, wherein the protrusion includes an inner space which is accessible from an outside of the sheet tray, and the grip is a surface defining the inner space.

4. The sheet tray according to claim 1, wherein a center part of the fourth support surface in a second direction, which is orthogonal to the first direction and is along the fourth support surface, is recessed further than both ends of the fourth support surface in the second direction.

5. The sheet tray according to claim 1, wherein the fourth support surface is inclined relative to the second support surface so that the pivoting front end of the third tray is positioned above a pivoting base end of the third tray, with the third tray being in the second pivoting position.

6. The sheet tray according to claim 1, wherein the second support surface includes a first concave part, and
the third tray in the first pivoting position is housed in the first concave part.

7. The sheet tray according to claim 1, wherein the first tray includes a second concave part which is recessed, in a direction opposite to the first direction, from a downstream end in the first direction, and
the protrusion is positioned in the second concave part in a state that the second tray is in the first position and the third tray is in the first pivoting position.

8. A conveyance unit comprising:
the sheet tray as defined in claim 1; and
the apparatus body supporting the sheet tray and including a conveyance path through which the sheet is conveyed.

9. The conveyance unit according to claim 8, further comprising:
a feed tray on which the sheet to be supplied to the conveyance path is placed; and
a feed mechanism including a feed roller configured to feed the sheet placed on the feed tray to the conveyance path,
wherein the sheet tray is configured as a cover covering an upper surface of the feed tray, and the feed tray and the sheet tray are configured to be inserted into and pulled out of the apparatus body integrally.

10. An image recording apparatus, comprising:
the conveyance unit as defined in claim 8; and
a recording unit configured to record an image on the sheet conveyed through the conveyance unit.

* * * * *

UNITED STATES PATENT AND TRADEMARK OFFICE
CERTIFICATE OF CORRECTION

PATENT NO.         : 9,688,498 B2
APPLICATION NO.    : 15/166357
DATED              : June 27, 2017
INVENTOR(S)        : Wataru Sugiyama et al.

It is certified that error appears in the above-identified patent and that said Letters Patent is hereby corrected as shown below:

In the Claims

In Column 16, Claim 1, Line 64:
Please delete "apart" and insert --a part--

Signed and Sealed this
Twenty-second Day of May, 2018

Andrei Iancu
*Director of the United States Patent and Trademark Office*